United States Patent Office 3,379,896
Patented Apr. 23, 1968

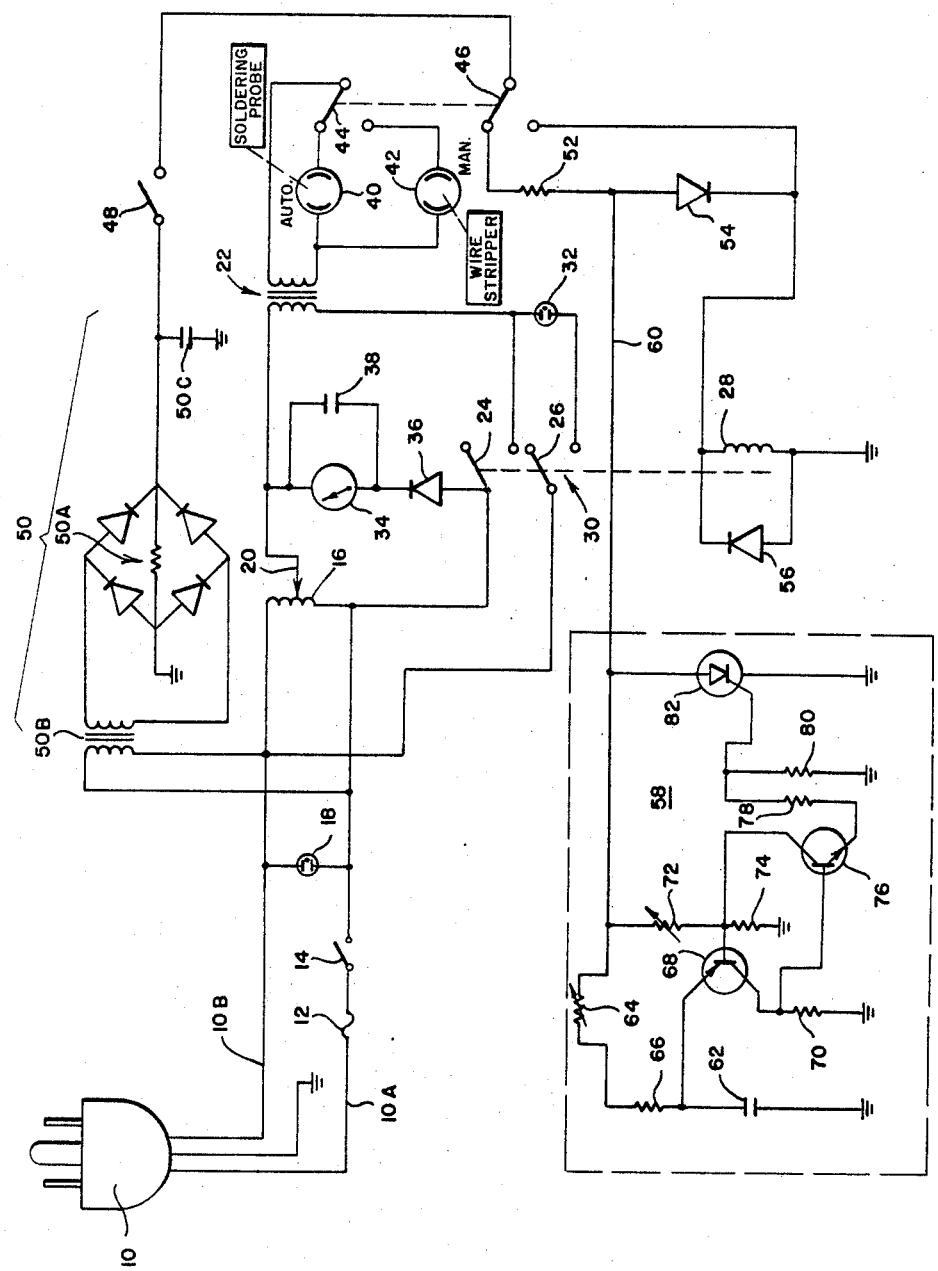

3,379,896
AUTOMATIC RESISTANCE SOLDERING
APPARATUS AND THE LIKE
Robert E. Wolfe, Los Angeles, Calif., assignor to Electro-Miniatures Corporation, New York, N.Y., a corporation of New York
Filed Sept. 3, 1964, Ser. No. 394,293
22 Claims. (Cl. 307—141)

ABSTRACT OF THE DISCLOSURE

Apparatus for operating a resistance soldering tool, wire stripper, or other device automatically or manually, in which an electric supply is connected to a selected electrical output by a control relay which is energized manually and deenergized manually or by a timer. The timer employs a transistor amplifier which senses the charge on a capacitor and fires an SCR to cause blocking of a rectifier supplying the control relay.

This invention relates to apparatus for resistance soldering and the like, and more particularly to apparatus for selectively soldering or thermal stripping automatically or manually.

Resistance soldering apparatus proposed heretofore lacks the versatility of variable mode operation and the capability of wide range precise adjustment, or is unduly complex. It is accordingly a principal object of the present invention to provide improved apparatus for overcoming these deficiencies.

In manufacturing operations it is often desired to strip the insulation from the end of a wire so that the exposed conductor may be soldered. Heretofore it has been necessary to provide a completely independent wire stripping tool or to provide an unwieldy attachment for modification of the soldering tool to permit thermal stripping. It is accordingly another object of the invention to provide apparatus in which soldering and thermal stripping operations may be carried out alternately, with instantaneous changeover from one mode of operation to the other, in which both the soldering and wire stripping tools are immediately available, but in which only one or the other tool may be energized at a given time, thereby avoiding injury to the operator which might occur if both tools were energized concurrently.

A further object of the invention is to provide apparatus of the foregoing type including a timing circuit which is conditioned for operation only when a manual-automatic switch is placed in automatic position.

Still another object of the invention is to provide apparatus of the foregoing type in which both manual and automatic operations are initiated by the same main switch, preferably a foot switch, which is capable of terminating the manual operation at any time and of terminating the automatic operation at any time prior to preset automatic termination.

A further object of the invention is to provide apparatus of the foregoing type in which the main switch may be operated in the same manner for both automatic and manual operation, thereby avoiding operator confusion.

A more specific object of the invention is to provide apparatus of the foregoing type employing a single control relay for both automatic and manual operation, the relay being energized by operation of the main switch in the same manner for both automatic and manual operation and being de-energized manually or automatically.

A further object of the invention is to provide an improved RC solid-state timing circuit, which is simple, which operates reliably, which ensures full discharge of the capacitor, and which requires no moving contacts for de-energizing a control relay.

Further objects of the invention are in apparatus of the foregoing type, to accommodate a wide variety of soldering jobs from medium-heavy to ultra-fine pinpoint applications, to provide widely variable but precisely controlled soldering time and temperature, to provide simplicity of operation which minimizes required operator judgment, to avoid heat loss, preheating, or hand pressure in soldering, and to provide high speed repetitive soldering operations having high quality, reliability, and uniformity.

Briefly stated, but without intent to limit the scope of the invention, a preferred embodiment comprises, in a compact, self-contained unit, a pair of electric outlets, one for automatic operation and one for manual operation, an electric supply circuit, a control relay arranged to connect the supply circuit to the outlets, an automatic-manual selector switch for conditioning one or the other of the outlets for operation and for concurrenly conditioning the control relay for manual or automatic operation, an adjustable timing circuit for de-energizing the relay at a preset time after energization, a main switch for energizing and de-energizing the relay during manual operation and for energizing the relay and the timing circuit during automatic operation, controls for adjusting the duration and amplitude of the heating current supplied to the outlets, and an indicator for indicating the cessation of the heating current during automatic operation.

The foregoing and other objects, advantages, and features of the invention and the manner in which the same are accomplished will become more readily apparent upon consideration of the following detailed description of the invention taken in conjunction with the accompanying drawing, which illustrates a preferred and exemplary embodiment, and wherein:

The single figure is a schematic diagram of a circuit in accordance with the invention.

Referring to the drawing, the apparatus illustrated is readily contained within a compact housing (not shown) having a panel at which are exposed the outlets, controls, and indicators to be described. The apparatus may be energized from a conventional 115-volt AC source to which the plug 10 is connected. The plug is a conventional 3-prong type having a center prong for grounding the housing of the apparatus. One of the line conductors, 10A, extending from the plug is connected through a fuse 12 and line switch 14 to one end of an autotransformer 16, the other end of which is connected to the other line conductor, 10B. An indicator lamp 18, such as a neon bulb, is connected across the line conductors and is lit when switch 14 is closed. The autotransformer has a variable tap 20 connected to one side of the primary winding of an output transformer 22. The other side of the primary winding is connected to one side of the autotransformer by means of a switch 24 ganged with switch 26. The switches and an operating coil 28 form a control relay 30. Energization of the relay closes switches 24 and 26 upon their lower contacts, completing a circuit for the primary of transformer 22 and for an indicator lamp 32, which is arranged to be connected across the line conductors.

The autotransformer 16 is employed to adjust the amplitude of the heating current, an indication representative of the heating current being displayed upon a DC volt meter 34, which may have a 0 to 150-volt range for example, and which is in series with a rectifying diode 36. A capacitor 38 shunted across the meter stores the DC voltage from the diode. The meter provides continuous readings of the autotransformer setting. The required input voltage for the transformer 22 is determined by the size of the work or the material to be soldered, for example. Meter 34 may be scaled simply from 1 to 10, so as to provide a uniform symmetrical type dial which can be easily read and referred to for setting up the apparatus in reoccurring operations.

The secondary winding of transformer 22 is arranged for connection to a pair of conventional electric outlets or receptacles 40 and 42. Outlet 40 is for automatic operation, while outlet 42 is for manual operation. One terminal of each outlet is connected to one side of the secondary winding, while the other terminal of each outlet is connected to a respective terminal of a double-throw switch 44, the blade of which is connected to the other side of the secondary winding, thereby to condition the receptacles for operation alternately. Switch 44 is ganged with a double-throw switch 46. Both switches may be operated by a toggle lever, for example, exposed at the panel of the apparatus. The blade of switch 46 is connected to a main switch 48, which is preferably a foot switch actuated by the operator. Switch 48 is connected to the positive terminal of a conventional DC power supply 50, including a full wave bridge rectifier 50A with bleeder resistor, a supply transformer 50B energized from the line conductors, and a filter capacitor 50C. Closing switch 48 energizes coil 28 of relay 30 through a current limiting resistor 52 and a diode 54, if switch 46 is in its automatic (upper) position, or directly, if switch 46 is in its manual (lower) position. Coil 28 has one end connected to receive DC from switch 46 and its other end connected to ground (which may be earth or chassis potential). A diode 56 is connected across the coil with the polarity shown to absorb transients and to provide a current path across the coil when the relay is de-energized.

Switch 46 also controls the energization of a timing circuit 58 by means of conductor 60. The timing circuit comprises a capacitor 62 which is charged through a timing potentiometer 64 and a resistor 66 from conductor 60, one side of the capacitor being connected to resistor 66 and the other side being connected to ground. The ungrounded side of the capacitor is connected to the emitter of a PNP transistor 68, the collector of which is connected through a biasing resistor 70 to ground. The base of transistor 68 is connected to the junction of a biasing potentiometer 72 and the biasing resistor 74, which form a voltage divider from conductor 60 to ground. The base of transistor 68 is also connected to the collector of an NPN transistor 76, which has its base connected to the collector of transistor 68 and its emitter connected through a current limiting resistor 78 and a biasing resistor 80 to ground. The junction of resistors 78 and 80 is connected to the triggering electrode of a silicon controlled rectifier (SCR) 82, the cathode of which is connected to ground and the anode of which is connected to conductor 60.

Potentiometer 64 has a time-calibrated dial on the panel of the apparatus housing. Potentiometer 72 permits adjustment of the bias at the base of transistor 68 so that the calibration of potentiometer 64 will be the same for different apparatus units in spite of component variations.

To use the apparatus of the invention for automatic resistance soldering a conventional resistance soldering probe is plugged into receptacle 40, as indicated by the block adjacent to the receptacle. Such probes comprise a pair of closely spaced electrodes mounted in a suitable insulating hand-piece, a heating circuit being provided when the electrodes are bridged by a conductor to be soldered. Line switch 14 is closed, energizing lamp 18, and switches 44 and 46 are placed in the automatic (upper) position. Autotransformer 16 is adjusted to provide a suitable heat level setting indicating on the meter 34. For example, a miniature connector solder pot having an outside diameter of .05 inch and an inside diameter of .02 inch and containing a solder preform, well known in the electronic arts, requires a typical heat level setting of 3.0 on the meter 34, which is calibrated from zero to 10. Potentiometer 64 is set to provide a suitable heating current duration, which in the example given may be 0.8 second. The time is indicated on the potentiometer dial, which may have a range from 100 milliseconds to 5 seconds.

The soldering probe is applied to the part to be soldered, and then foot switch 48 is depressed and held. When the foot switch closes, relay coil 28 is energized, closing switches 24 and 26 upon their lower contacts, thereby applying electric power to transformer 22 and to the selected outlet 40, and energizing lamp 32. Closing the foot switch also supplies electric power to conductor 60 and the timing circuit 58. Capacitor 62 charges from the positive DC supply 50 until the potential applied to the emitter of transistor 68 becomes more positive than the potential at the base of the transistor and the transistor commences to conduct. The collector current of transistor 68 through resistor 70 makes the potential at the base of transistor 76 more positive, causing transistor 76 to conduct. When transistor 76 conducts, collector current is drawn through potentiometer 72, making the base of transistor 68 more negative and driving this transistor more heavily into conduction, further raising the voltage at the base of transistor 76 and driving this transistor more heavily into conduction.

The collector current of transistor 76 through resistor 80 makes the potential at the triggering electrode of the SCR 82 more positive, triggering the SCR into conduction. When this occurs, the voltage on conductor 60 drops almost to ground (for example, one volt positive with respect to ground) so that the potential at the ungrounded end of relay coil 28 is now more positive than the potential on conductor 60. Diode 54, therefore, becomes non-conductive, opening the circuit to the relay coil. The magnetic field of the relay coil collapses, transients being absorbed by diode 56, and the relay opens, returning switches 24 and 26 to the position illustrated and deenergizing the outlet 40 and the indicating lamp 32.

When the SCR conducts and the potential of conductor 60 drops almost to ground, the potential at the base of transistor 68 is then much less positive than the potential at the emitter of the transistor. The transistor conducts heavily and capacitor 62 very rapidly discharges through the transistor almost to ground potential.

When lamp 32 is extinguished at the end of the timing interval, the operator is informed that he may release the foot switch 48, thereby removing power from the timing circuit and ensuring that the SCR becomes non-conductive before the next timing interval.

The apparatus of the invention may be utilized for manual soldering or thermal wire stripping by plugging the appropriate tool into receptacle 42 and by moving the selector switches 44 and 46 to their manual position. This will permit energization of receptacle 42 and lamp 32 when foot switch 48 is depressed to complete an energizing circuit for relay coil 28. The timer will not be energized, and the relay coil and the lamp will remain energized until the foot switch is released.

It should be noted that during both automatic and manual operation release of the foot switch will de-energize the selected receptacle (assuming in automatic operation that the receptacle has not previously been de-energized by the timer). Thus, even in automatic operation the foot switch can override the timer and terminate the soldering operation.

A thermal stripping tool, for example of the type illustrated and described in Patent No. 2,978,565 issued to Sullivan et al. on April 4, 1961, may be maintained plugged into the receptacle 42 while a soldering probe is plugged into receptacle 40, so that manual stripping is immediately available simply by moving ganged switches 44 and 46 to the manual position. If the switches are returned to the automatic position, soldering operations may continue. Although both tools may be plugged in at the same time, for convenience, only one tool can be energized at a given time, ensuring safety to the operator.

Wire stripping may also be performed automatically by plugging the stripping tool into receptacle 40, a suitable heating interval and heating current being selected as described above in connection with soldering.

Wide variation of heating current amplitude and duration, in other words the amplitude and duration of the heating current pulse, can be provided with the apparatus of the invention. The suitable settings of these parameters may be determined empirically and then recorded so that the apparatus may be readily set for future operations of the same type. This ensures uniform, consistent, high quality soldered connections, which may be made very rapidly and repetitively. Similarly, automatic wire stripping in accordance with the invention ensures elimination of excessive carbonization of the insulation, elimination of burning or annealing of plated or unplated conductors, and provides repetitive high speed operation with minimal operator judgment.

While a preferred embodiment of the invention has been shown and described, it will be apparent to those skilled in the art that changes can be made without departing from the principles and spirit of the invention, the scope of which is defined in the appended claims. For example, in some instances certain advantages of the invention may be attained with permanently connected tools and in such instances the term "outlet" is intended to be generic. Accordingly, the foregoing embodiment is to be considered illustrative, rather than restrictive of the invention, and those modifications which come within the meaning and range of equivalency of the claims are to be included therein.

The invention claimed is:

1. Apparatus for soldering and the like having, in combination, an electric supply circuit, a pair of electric outlets adapted for connection to electrically energized tools, one of said outlets being for automatically timed use and the other of said outlets being for manually timed use, means including a control switch connected to said supply circuit for controlling the application of electric power from said supply circuit to said outlets, means including a selective switch having a first position connecting said automatically timed outlet to said control switch for operation and a second position connecting said manually timed outlet to said control switch for operation, means including a main switch connected to said controlling means for closing said control switch, and timer means connected to said controlling means for opening said control switch when said selective switch is in its first position.

2. The apparatus of claim 1, said controlling means comprising a relay having means for energizing it and de-energizing it manually by said main switch when said selective switch is in its second position and for energizing it manually by said main switch and de-energizing it by said timer means when said selective switch is in its first position.

3. The apparatus of claim 1, said timer means having an energization circuit including said main switch and an additional selective switch ganged with the first-mentioned selective switch and connected in series with said main switch.

4. Apparatus for soldering and the like having, in combination, electric outlet means supplying an electrically energized tool for automatically timed or manually timed operation, an electric supply circuit, relay means having a control switch connected to said supply circuit and said outlet means for controlling the connection of said supply circuit to said outlet means for both automatic and manual operation, an energization circuit including a main switch connected to said relay means for energizing and de-energizing said relay means when said main switch is closed and opened, respectively, during manual operation and for energizing said relay means when said main switch is closed during automatic operation, and timer means connected to said relay means and said main switch for de-energizing said relay means during automatic operation a predetermined time after the closing of said main switch.

5. The apparatus of claim 4, said timer means having means for energizing it concurrently with the energizing of said relay means during automatic operation.

6. The apparatus of claim 4, said main switch being arranged to override said timer means and to de-energize said relay means when said main switch is opened during automatic operation.

7. Apparatus for soldering and the like having, in combination, a power supply circuit including an autotransformer having a variable tap, an output transformer having a primary winding and a secondary winding, switch means for connecting said primary winding between said tap and one end of said autotransformer, an electric outlet connected to said secondary winding and adapted for connection to an electrically energized tool, said tap being adjustable to vary the amplitude of the current supplied to said outlet, and means connected to said switch means for closing said switch means and for controlling the length of time during which said switch means is closed in order to control the duration of the current supplied to said outlet.

8. The apparatus of claim 7, further comprising indicating means connected to said autotransformer and responsive to the adjustment of said autotransformer for giving an indication of the amplitude of said current.

9. The apparatus of claim 7, said means for controlling the length of time during which said switch means is closed comprising timer means for opening said switch means after a selected interval.

10. The apparatus of claim 7, further comprising an indicator, and means connected to said indicator and said switch means for energizing said indicator concurrently with the closing of said switch means.

11. Apparatus for soldering and the like having, in combination, an electric outlet adapted for connection to an electrically energized tool, an electric supply circuit, a relay having switch means for controlling the connection of said supply circuit to said outlet and having a coil for closing said switch means, an energizing circuit for said relay coil including a source of electric energy and a main switch connected in series to said coil through a rectifier which is poled to pass energizing current to said coil when said main switch is closed, and means connected to said rectifier for causing said rectifier to block while said main switch is closed, thereby to de-energize said coil and open said switch means.

12. The apparatus of claim 11, further comprising another rectifier connected across said coil and poled to absorb currents produced during the collapse of the magnetic field of said coil.

13. The apparatus of claim 11, said means for causing said rectifier to block comprising timer means operative a predetermined time after closing of said switch means.

14. The apparatus of claim 13, said timer means comprising a timing circuit having an energizing conductor connected to the side of said rectifier remote from said relay coil, whereby said timing circuit may be energized from said conductor concurrently with the energization of said relay coil.

15. The apparatus of claim 14, said timer means comprising controlled rectifier means connected to said conductor for reducing the potential on said conductor when said rectifier means is conductive.

16. The apparatus of claim 15, said timer means further comprising an RC network and means connected to said network for triggering said controlled rectifier means when the potential upon a capacitor of said network reaches a predetermined level and for thereupon discharging said capacitor.

17. The apparatus of claim 16, said means for triggering said controlled rectifier means comprising a solid state amplifier responsive to the potential upon said capacitor.

18. Timing apparatus comprising a capacitor, an electric supply conductor connected to said capacitor by a resistor for charging said capacitor, a controlled rectifier connected to said conductor for electric supply therefrom and having a triggering electrode and amplifier means having inputs connected to said conductor and said capacitor and an output connected to said triggering electrode and responsive to the relative potential upon said conductor and said capacitor for triggering said controlled rectifier and discharging said capacitor when the potential on said capacitor reaches a predetermined level, said amplifier means comprising a pair of transistors of opposite conductivity type, one of said transistors having its emitter connected to said capacitor, having its base connected to a source of potential which varies with the potential upon said conductor and connected to the collector of the other transistor, and having its collector connected to the base of the other transistor, the emitter of the other transistor being connected to the triggering electrode of said controlled rectifier.

19. Timing apparatus comprising a capacitor, an electric supply conductor connected to said capacitor by a resistor for charging said capacitor, a controlled rectifier connected to said conductor for electric supply therefrom and having a triggering electrode, amplifier means having inputs connected to said conductor and said capacitor and an output connected to said triggering electrode and responsive to the relative potential upon said conductor and said capacitor for triggering said controlled rectifier and discharging said capacitor when the potential on said capacitor reaches a predetermined level, a relay coil, and rectifier means for normally supplying energizing current to said coil from said conductor but for blocking when said controlled rectifier conducts.

20. Timing apparatus comprising a capacitor, an electric supply conductor connected to said capacitor by a resistor for charging said capacitor, a controlled rectifier connected to said conductor for electric supply therefrom and having a triggering electrode, and amplifier means having inputs connected to said conductor and said capacitor and an output connected to said triggering electrode and responsive to the relative potential upon said conductor and said capacitor for triggering said controlled rectifier and discharging said capacitor when the potential on said capacitor reaches a predetermined level, said amplifier means comprising a pair of transistors, and means interconnecting said transistors, said capacitor, and said controlled rectifier for causing each of said transistors to increase the conduction of the other when one of said transistors conducts in response to the potential on said capacitor.

21. The apparatus of claim 20, said interconnecting means comprising means for continuing the conduction of said one transistor to discharge said capacitor in response to a change in potential of said conductor when said controlled rectifier conducts.

22. Timing apparatus comprising a capacitor, an electric supply conductor connected to said capacitor by a resistor for charging said capacitor, a controlled rectifier connected to said conductor for electric supply therefrom and for substantially reducing the potential upon said conductor when said rectifier is conductive, said rectifier having a triggering electrode, and amplifier means having an input connected to said capacitor, having a bias circuit supplied from said conductor for rendering said amplifier means non-conductive, and having an output connected to said triggering electrode, said amplifier means being responsive to the potential upon said capacitor relative to the bias supplied from said conductor for conducting when the potential on said capacitor reaches a predetermined level relative to said bias and for triggering said controlled rectifier and discharging said capacitor through the amplifier means while the potential of said conductor is reduced by conduction of said rectifier to maintain said amplifier means conductive.

References Cited
UNITED STATES PATENTS

| | | | |
|---|---|---|---|
| 3,200,258 | 8/1965 | Carrol | 317—148.5 X |
| 2,421,411 | 6/1947 | Clayton | 307—141 |
| 2,797,270 | 6/1957 | Yates | 307—141.8 X |
| 3,005,919 | 10/1961 | Dias | 307—141.4 |
| 3,270,812 | 9/1966 | Gilchrist et al. | 317—141 X |
| 3,287,722 | 11/1966 | Craig | 307—141 X |

ORIS L. RADER, *Primary Examiner.*

BENJAMIN DOBECK, *Examiner.*

T. B. JOIKE, *Assistant Examiner.*